Jan. 10, 1950  H. E. HAYNES  2,494,440
SPECTROPHOTOMETER APPARATUS HAVING A ROTATING
SLOTTED WHEEL TO DECREASE LIGHT INTENSITY
Filed May 31, 1946

INVENTOR.
Harold E. Haynes
BY
ATTORNEY.

Patented Jan. 10, 1950

2,494,440

UNITED STATES PATENT OFFICE 2,494,440

SPECTROPHOTOMETER APPARATUS HAVING A ROTATING SLOTTED WHEEL TO DECREASE LIGHT INTENSITY

Harold E. Haynes, Indianapolis, Ind., assignor to Radio Corporation of America, a corporation of Delaware Application May 31, 1946, Serial No. 673,361

2 Claims. (Cl. 88—14)

This invention relates to improvements in a method and apparatus for measuring light values. More specifically, it relates to improving the linearity of a particular type of spectrophotometer in the lower range of light values.

There has previously been disclosed a greatly improved spectrophotometer embodying an automatic gain control circuit. This spectrophotometer is described in application of Glenn L. Dimmick, Serial No. 657,974, filed March 29, 1946, now Patent No. 2,474,098. This device gives accurate and dependable readings over most of the range of light values commonly met with where instruments of this nature are used. However, due to some non-linearity of the electrical measuring system used in the instrument, when the light being measured is of relatively low intensity, light values indicated are not of the degree of accuracy needed in some types of work.

One object of the present invention then is to provide a modification in the Dimmick apparatus which will enable light of low intensity to be measured just as accurately as light of ordinary and of relatively high intensities.

Another object is to provide a means of eliminating the necessity of using the non-linear portion of the operating range of the electrical measuring system by increasing the sensitivity, thereby increasing the accuracy of the spectrophotometer for low light values.

Another object is to provide an improved method of measuring light values where the light is of low intensity.

Other objects will be apparent to those skilled in the art and the invention will be better understood from a study of the description which follows, together with the accompanying drawings, of which:

Figure 1:
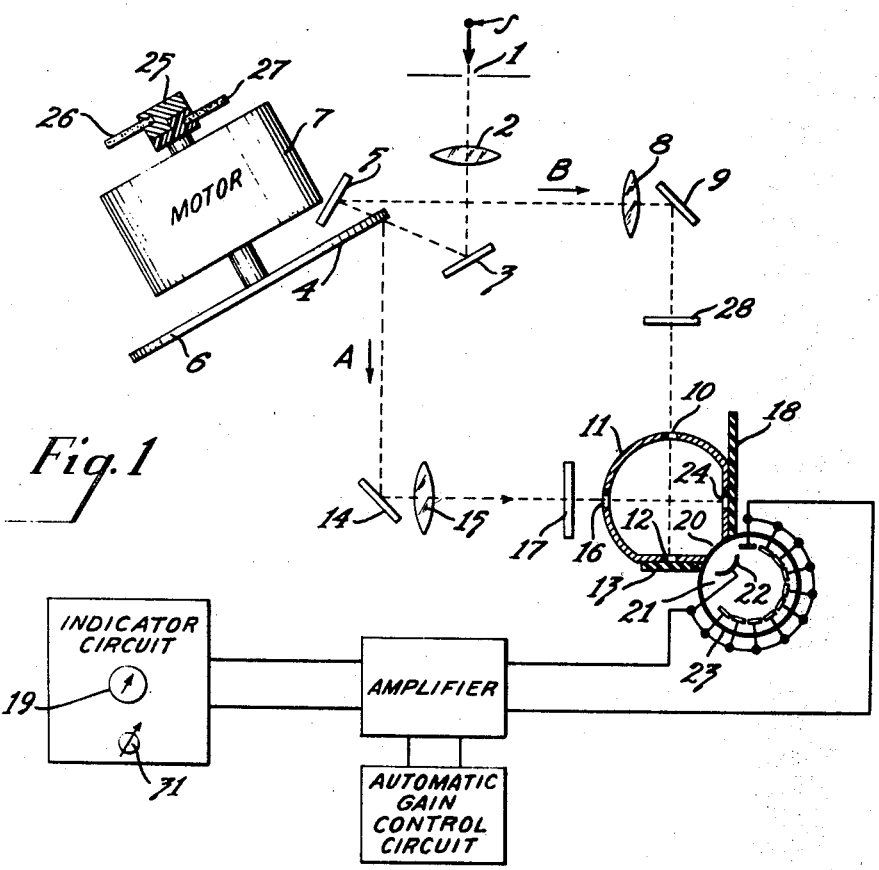
Fig. 1 illustrates how the invention is used in connection with the Dimmick spectrophotometer.

The basic optical system of the Dimmick spectrophotometer is as follows: As shown in Figure 1, light source S emitting light of the wavelength being tested passes through the exit slit 1 of a spectrometer which may be of the curved grating type, then passes through a focussing lens 2 and strikes a mirror 3. From this mirror the light is reflected to mirror 4 or 5. Lens 2 forms an image of the curved grating in the spectrometer on the mirror 4. The mirror 4 is on a disc 6 which is rotated at high speed by a motor 7. This mirror covers only a part of the disc 6 and reflects light for only a portion of each revolution of the motor. During another portion of each revolution of the motor, the light passes to mirror 5 where it is reflected along a path through lens 8 to mirror 9. Here it is deviated 90° and passes through window 10 in the small integrating sphere 11 and through another window 12 on the opposite side of the sphere to a white standard such as a block of magnesium carbonate 13. Light reflected from mirror 4 is again reflected from mirror 14 through lens 15 and into the integrating sphere through window 16. If a transmitting test sample is being measured, it is placed at 17 or if a reflecting sample is used, it is placed at 18 and the recording meter 19, which may be a milliammeter, is set at full scale reading. If a transmitting sample is being measured, a block of the white standard is placed at 18 and the transmitting sample is measured in terms of the transmission of pure air. A reflecting sample is measured in terms of the white standard. The integrating sphere is preferably smoked with magnesium oxide on its inner surface. From the exit window 20 light passes out of the integrating sphere into an electron multiplier 21, having a cathode 22. A light shield 23 excludes stray light. Direct rays from standard 13 and test sample 17 cannot reach the multiplier cathode. Only the light which is diffusedly reflected from the walls of the sphere can enter the electron multiplier. Lenses 8 and 15 perform the function of re-forming the image at mirror 4 upon the standard 13 and test sample.

As previously stated, the mirror 4 covers only a part of disc 6. It therefore acts as a light chopper when the disc rotates and in this form of the device, the light may be said to be transmitted in pulses. Most of the disc has a black non-reflecting surface and another part of the disc is cut away to allow light to pass through. When the mirror portion is in the path of the light beam, light is reflected from it along path A which intercepts the test sample. When the cut-out portion is in the path of the beam, the light traverses the path B to strike the standard.

When the relative amount of light reflected by a reflecting sample is to be measured, the sample is set in position at 18 behind window 24. A white standard is also in position at 13 behind window 12. Light pulses reflected from the sample and light pulses reflected from the white standard 13 are alternately measured by the electron multiplier 21 with the aid of commutator 25 and brushes 26 and 27. As also described in the previously mentioned Dimmick application, the output of the electron multiplier is amplified by an amplifier which is set to constant gain by means of the automatic gain control system. This gain is automatically and continuously adjusted by the pulses of light received from the standard 13 to produce a certain electrical output, and the alternate pulses from the sample 18 being tested are measured at the same overall gain and indicated on meter 19.

In practice, it is found that although a 100 percent scale reading on the meter 19 corresponds to about 105 volts output on the rectifier used in the circuit even this high voltage permits some small non-linearity to exist in the low end of the intensity curve. It has been found, for example, that linearity is perfectly satisfactory down to about 5 percent reflection or transmission, but that if the obvious expedient is resorted to of substituting a more sensitive meter for a lower range, as one which reads full scale when 20 percent of the maximum light intensity is present, the non-linearity is unsatisfactory.

The present invention then results in providing a more sensitive instrument in the lower ranges of light intensity by, in effect, substituting for the 100 percent reflecting standard 13 a standard of less reflectivity. This lower valued standard may, for example, cause a light which has an intensity only 20 percent of that of the standard to read full scale on the meter if a full scale sensitivity of 20 percent is desired.

The manner in which this is done is shown in Figure 1. Somewhere in the path of the gain-setting beam B is placed a neutral density filter 28 having transmission value T. This filter may conveniently be placed between mirror 9 and the window 10 in the integrating sphere. The filter is selected so that T, its transmission value, is a constant which is equal to the full scale sensitivity which is desired to be obtained.

The gain control circuit now causes the standard output to be developed during the gain-setting pulse by only a fraction of the light normally used, this fraction T being that representing the percent transmission of the filter 28. The effect is thus to increase the meter indication for the light contained in the measuring pulse to $$\frac{1}{T}$$

times its usual value. This is so since the gain has automatically been set to $$\frac{1}{T}$$

times its former value in order to make the fraction T of the gain-setting pulse produce the standard output. For example if T is 0.2, the gain will automatically rise to $$\frac{1}{0.2}$$

or 5 times its normal value. Thus, a value of light intensity received from the test sample of only 20 percent of normal will now cause the meter to read full scale.

The neutral density filter need not be of the transmission type but can also be of the reflecting type. If this type of light reducing means is used, it is inserted in place of the reflecting standard 13 instead of being placed as at 28 in the drawings.

The advantage of the system is obvious. It is the electrical measuring circuit which introduces the non-linearity at low levels of light intensity and therefore by causing the circuit to work at full level even with full scale readings of much less than normal, the linearity is made just as good as for readings in which 100 percent light intensities read full scale. This would not be true if the lower part of the range were merely magnified by using a more sensitive meter.

The success of the method of the invention depends on at least two factors. The first is in having a measuring system with a reserve of gain at least as great as the factor by which the full scale percentage is to be reduced. The second is in selecting a filter 28 which is truly neutral, i. e., one having equal transmission for all wave lengths in the range to be measured. The circuit described in the previously mentioned Dimmick application has ample reserve gain for any useful increase in sensitivity which is likely to be desired. The problem of obtaining a suitable filter may be solved in one of several ways.

Although preferred, it is not absolutely necessary to use a neutral density filter. A non-uniform filter may be used if it is calibrated carefully. Filters similar in type to the Wratten filters of Eastman Kodak Company may be utilized although none of the filters available at this time are truly neutral.

Figure 2:
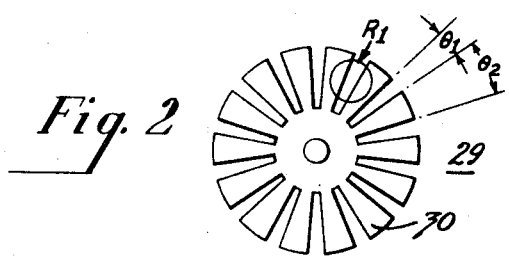
Fig. 2 shows one form of apparatus for cutting down light intensities independently of wavelength.

Another type of filtering arrangement which is truly neutral may be used. This is shown in Figure 2 and reduces the light intensity by a factor independent of wave length. A wheel 29 having regularly spaced teeth 30 is placed with its axis approximately parallel to the gain setting beam B in position such as at 28 and is so placed as to chop the light. The beam is allowed to strike the wheel in the region $R_1$. The wheel has enough teeth and is rotated sufficiently fast that the ripple frequency is adequately high. Its teeth are so proportioned that the desired fraction $T^1$ of the light is transmitted. The relation is $$T^1 = \frac{\theta_1}{\theta_1 + \theta_2}$$

where $T^1$ is the fractional transmission, $\theta_1$ is the slot angle and $\theta_2$ the tooth angle.

Still another arrangement which may be used is an aperture having an adjustable opening. Various positions of the stop may be calibrated for the relative amount of light transmitted at each particular diameter of opening.

With one of the above described filters in position readings are taken in a manner similar to that explained in connection with the device with no filter. In the case of a sample which either reflects or transmits a small percentage of the impinging light a reading is first taken with the test sample absent and no neutral density filter in the gain-setting beam B. The meter 19 is set to full scale reading by means of the variable resistor control 31. The filter is then placed in the gain-setting beam, the test sample is set in position and another reading taken. If the filter used is one which reduces light intensity to 20 percent of the former value, the readings taken on the meter with the test sample in place will be 5 times actual value. The true value is therefore obtained by dividing these readings by 5. Just as in the case where no filter was used, a reflecting test sample is placed behind window 24 in position 18 and if a transmitting sample is being measured, it is inserted at 17.

There has thus been described a simple and convenient method and apparatus for measuring light intensities having relatively low values which extends the range of accuracy of the Dimmick Spectrophotometer. The only additional operations required are the insertion of a neutral density filter in the apparatus and another elementary calculation to reduce meter readings to their true value. Of course, a different calibration scale may be placed on the meter to make it direct reading.

I claim as my invention:

1. An apparatus comprising means for forming a beam of light of predetermined width, photoresponsive means positioned in the path of said beam, and neutral density light filtering means for decreasing the intensity of said beam without interrupting the passage thereof, positioned between said source and said photoresponsive means, said filtering means consisting of a rotatable wheel having regularly spaced opaque members of similar width separated by slots, the width of each of said opaque members and slots individually being less than the width of said beam, the width of said beam being greater than the combined average widths of one slot and one opaque member, means for rotating said wheel at a constant rate and said wheel being positioned such that when said wheel is rotated said opaque members and said slots are moved consecutively across said beam.

2. An apparatus comprising means for forming a beam of light of predetermined width, photoresponsive means positioned in the path of said beam and neutral density light filtering means for decreasing the intensity of said beam without interrupting the passage thereof, positioned between said source and said photoresponsive means, said filtering means consisting of a rotatable wheel having regularly spaced opaque members of similar width separated by slots, the width of each of said opaque members and slots individually being less than the width of said beam, the width of said beam being greater than the combined average widths of one slot and one opaque member, means for rotating said wheel at a constant rate, the number of said slots and the speed of rotation of said wheel being sufficient to provide an adequately high ripple frequency, and said wheel being positioned such that when said wheel is rotated said opaque members and said slots are moved consecutively across said beam.

HAROLD E. HAYNES.

REFERENCES CITED

The following references are of record in the file of this patent:

UNITED STATES PATENTS

| Number | Name | Date |
|---|---|---|
| 1,799,134 | Hardy | Mar. 31, 1931 |
| 1,863,363 | Zworykin | June 14, 1932 |
| 1,999,023 | Sharp et al. | Apr. 23, 1935 |
| 2,186,203 | Centeno | Jan. 9, 1940 |
| 2,234,329 | Wolff | Mar. 11, 1941 |
| 2,240,722 | Snow | May 6, 1941 |
| 2,267,282 | Larson | Dec. 23, 1941 |
| 2,287,322 | Nelson | June 23, 1942 |
| 2,442,910 | Thomson | June 8, 1948 |

FOREIGN PATENTS

| Number | Country | Date |
|---|---|---|
| 389,214 | Great Britain | Mar. 16, 1933 |